United States Patent [19]

Erwin

[11] 4,073,468
[45] Feb. 14, 1978

[54] ROTARY PLUG VALVE

[76] Inventor: Robert L. Erwin, 1702 N. Mesa Verde Ave., Farmington, N. Mex. 87401

[21] Appl. No.: 724,090

[22] Filed: Sept. 16, 1976

[51] Int. Cl.$^2$ ............................................. F16K 31/44
[52] U.S. Cl. ........................................ 251/77; 251/163
[58] Field of Search .................. 251/162, 163, 161, 77

[56] References Cited

U.S. PATENT DOCUMENTS

| 1,857,861 | 5/1932 | Nordstrom | 251/162 |
| 2,510,494 | 6/1950 | Bowan | 251/163 |
| 2,580,212 | 12/1951 | Anderson | 251/163 X |
| 2,988,319 | 6/1961 | Erwin | 251/163 |

Primary Examiner—Harold W. Weakley

[57] ABSTRACT

A tapered rotary valve plug fits into a tapered valve chamber and is rotated by an operating head or cap. Cam means are provided to automatically shift the operating head and valve plug axially as the head is rotated. A pin-and-slot connection between the operating head and valve plug is provided whereby rotation of the plug is delayed until the plug has been lifted from its seat, after which rotation of the plug takes place as rotation of the head is continued. Spring means, tensioned during the initial relative rotation of the operating head and plug, are provided for restoring head and plug to their original position relative to each other as soon as the valve plug has been loosened from its seat. Means are also provided for positively stopping rotation of the plug at full open or closed positions.

10 Claims, 9 Drawing Figures

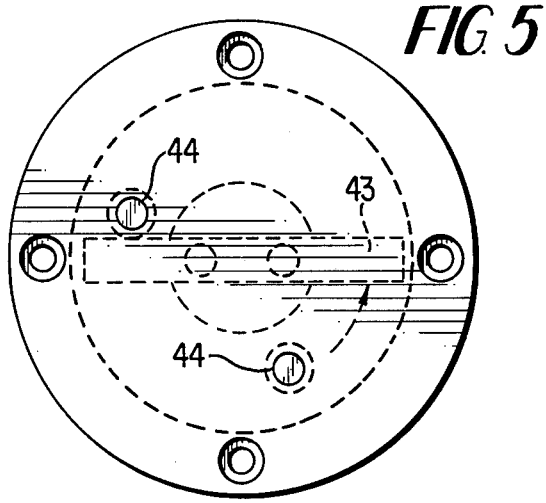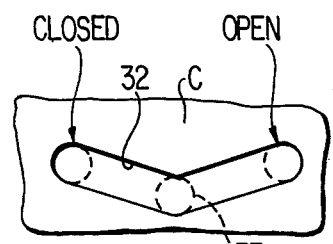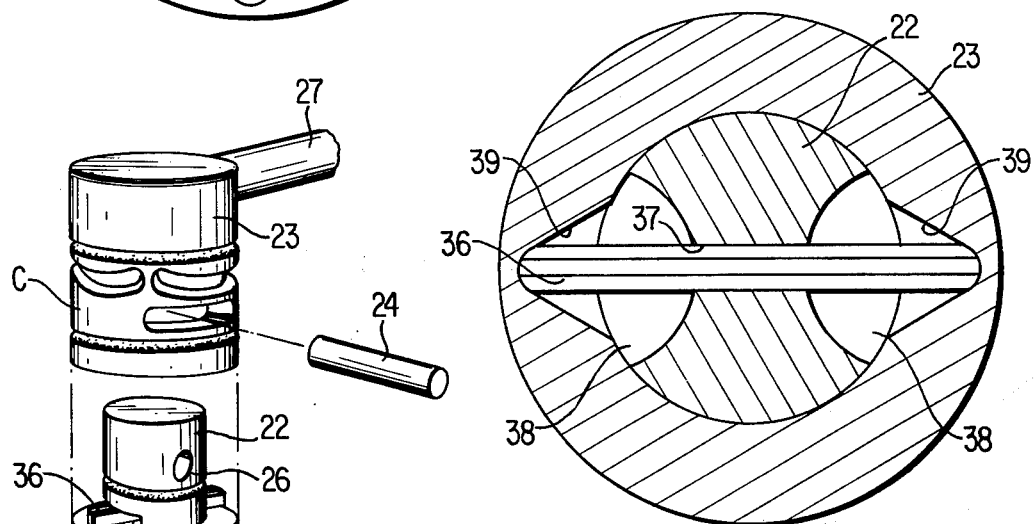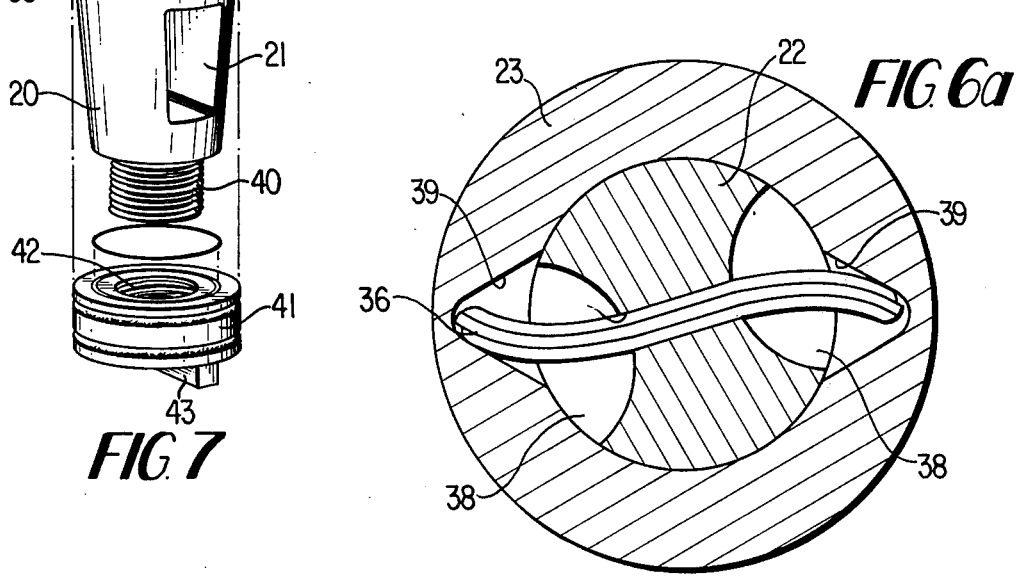

ROTARY PLUG VALVE

BACKGROUND AND SUMMARY OF THE INVENTION

My invention relates to improvements in rotary plug valves or valve assemblies of the type shown in my U.S. Pat. No. 2,988,319 dated June 13, 1961 comprising (1) a stationary valve body or casing including a main valve chamber having an inlet port and an outlet port communicating with the main valve chamber and (2) a rotary plug member snugly fitting into the main valve chamber, the plug member being provided with a through passage adapted when the plug is in open position to permit flow of fluid through the valve from the inlet port to the outlet port. Means are provided for rotating the valve plug through 90° to the open position from a closed position and vice versa. In order to provide a fluid tight fit, the plug valve and plug valve chamber are correspondingly tapered and preferably provided with sealing rings.

While this arrangement is effective in securing a fluid tight fit, it is difficult to turn the valve plug member and accordingly various means have been provided to overcome this defect.

In accordance with my U.S. Pat. No. 2,988,319, cam means are provided reacting between the valve casing and the rotary valve plug for automatically lifting the valve plug from its seat during rotation of the valve plug to and from the open to the closed position and vice versa.

In my prior patent, I also provide balancing means responsive to fluid pressure in the valve chamber for biasing the valve plug to its seated position against its tendency to become unseated by fluid pressure in said chamber. In spite of these improvements, there still remains a tendency for the tapered valve to stick and resist turning, and the present improvement is designed to reduce this tendency.

In accordance with my invention, I make the valve plug in two parts: one part comprising the tapered valve plug per se which fits in the valve chamber and the other comprising a plug operating head, cap or member provided with suitable actuating means such as an operating handle.

The operating head is provided with cam tracks which may be similar to the cam tracks disclosed in my U.S. Pat. No. 2,988,319 and which cooperate with pins projecting through the valve casing. Initial turning of the operating handle results in a rotary movement of the operating member, head or cap accompanied by a lifting movement due to the cam members which lifting movement is also imparted to the tapered valve plug which is thereby removed from its seat, and sticking eliminated.

The two parts, namely the cap or head and the valve plug are provided with a pin-and-slot connection permitting the operating cap and handle to be turned through a limited angle before rotary motion is imparted to the valve plug per se. Spring means preferably in the form of a pin or bar of spring steel, are also provided, interposed between the operating head or cap and the tapered valve plug. This pin is so arranged as to be stressed or biased during the initial turning movement of the handle and cap.

After the initial rotation of the valve cap relative to the valve plug and the lifting of the cap and plug relative to the casing, the spring means which has been biased due to the relative rotation of the cap and plug now tends to bring the cap and valve plug back to their original position relative to each other, since the valve plug has been lifted from its seat and is now readily rotatable. Continued rotation of the operating handle and cap brings the valve plug to its final open or closed position depending on the direction of the rotation of the operating handle due to the cam action, as set forth in U.S. Pat. No. 2,988,319.

In addition to the pin and slot connection between the valve plug and the operating cap and the spring biasing operation just described, the present device discloses improved details of construction of the valve assembly which include improvements in the balancing piston carried at the end of the valve plug and in the end plate of the cylindrical housing for the balancing piston. These improvements result in easier assembly of the valve parts and the improved operation of the valve assembly as a whole. Other improvements will be apparent from the further description of the invention.

The invention will be more readily understood by reference to the accompanying drawings and the following detailed description and claims.

BRIEF DESCRIPTION OF THE DRAWINGS

FIG. 5 is a bottom plan view of the end closure plate of the valve casing, with portions of the valve plug including a stop bar and stop plugs shown in dash lines.

FIG. 6 is a transverse sectional view taken on lines 6—6 of FIG. 4 showing the normal relative positions of the valve plug and operating head or cap, with the connecting spring pin shown in its unbiased position.

FIG. 6a is a view similar to FIG. 6 but with the operating head or cap rotated from its normal position relative to the plug as shown in FIG. 6 and with the spring pin shown in its biased position.

FIG. 7 is an exploded view of the various parts of the valve plug including (1) the operating head or cap and connecting pin; (2) the valve plug unit including spring tension pin; and (3) the balancing piston unit including the plug stop bar.

FIG. 8 is a diagrammatic view showing the arrangement of one of the cam tracks, and is similar to FIG. 6 of my U.S. Pat. No. 2,988,319.

GENERAL DESCRIPTION

Figure 1:
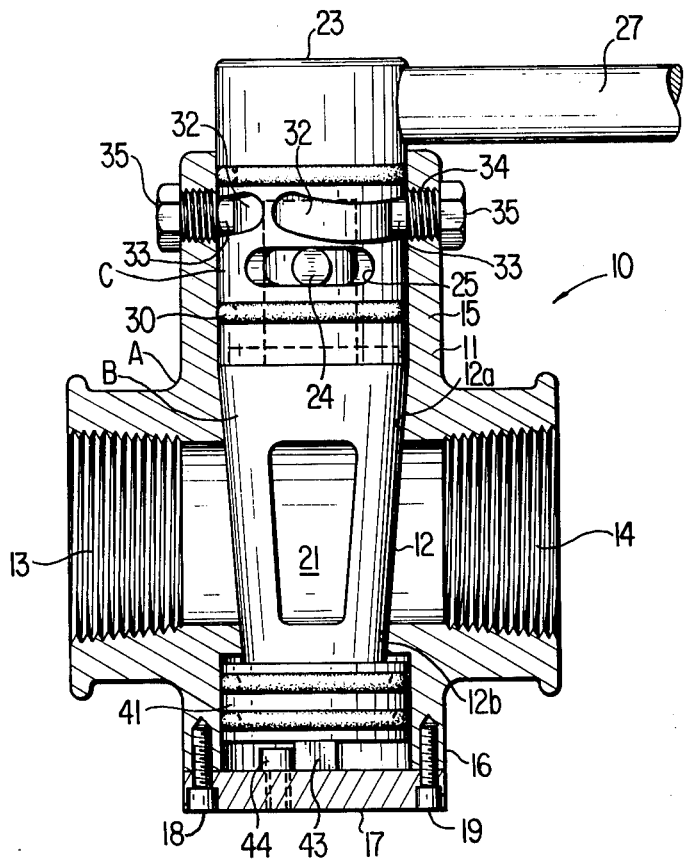
FIG. 1 is a view partly in vertical section showing the valve assembly in closed position and with the valve plug shown in elevation.

As previously set forth the invention relates, in general, to what I have referred to in my prior patent as a rotary plug valve which also may be referred to as a rotary plug valve assembly, which is generally designated by reference numeral 10 as in my prior U.S. Pat. No. 2,988,319. The principal parts of such valves comprise a valve casing generally designated A, a tapered valve plug generally designated B, and operating means for rotating the plug generally designated C which operating means includes an operating head or cap for the valve plug and a suitable operating handle.

In such valve assembly, the valve casing A is provided with a tapered valve chamber for seating the tapered valve plug B and is provided with inlet and outlet ports communicating with the valve chamber. The valve plug B is provided with a through opening adapted to communicate with the inlet and outlet ports when the valve is in the open position (FIG. 3) but in its closed position (FIGS. 1 and 2), the plug opening will be out of communication with the inlet and outlet ports. The valve casing A is also provided with a cylindrical neck portion leading to the valve chamber for receiving a portion of the plug operating head C, and with an opposite cylindrical portion provided with a removable end plate for receiving a balanced piston adapted to be threadedly secured to the outer end of the valve plug B, as best shown in FIGS. 4 and 7. Suitable cam means (FIGS. 1, 2, 3 and 8), are provided comprising cam grooves formed in the head C, and pins projecting through the cylindrical neck portion of the casing A and functioning similarly to the corresponding cam means in U.S. Pat. No. 3,988,319 in so far as the head C is concerned. The combined plug B and a portion of the operating head C may be readily inserted into the valve casing through the inlet neck portion thereof leading to the tapered valve chamber, and the balanced piston unit may be inserted through the lower end of the casing onto the threaded end of the plug B after which the end plate is applied and screwed into place.

The above features are generally indicated in my U.S. Pat. No. 2,988,319 but the present disclosure includes certain improvements which will now be described. In said patent, the tapered valve plug and cylindrical operating head or cap are shown as integral. In accordance with my present improvement, the operating head C and the valve plug B are formed of two separate parts as best illustrated in FIG. 7, which are adapted to be connected by means of relatively strong pin D extending therethrough. The head or cap portion C is slotted to permit limited relative rotation between the cap C and plug B. This arrangement permits partial rotation of the cap C relative to the plug B before any rotation is imparted to the latter, and at the same time imparts a lifting operation to both the cap C and plug B. The rotation of the cap or head C is relatively easy as the head is cylindrical in form rather than tapered as is the valve plug B, and the head fits in a cylindrical portion of the casing whereas the plug valve chamber portion of the casing is tapered or conical in form.

Following the initial rotation of the cap C, the cam operation is continued and the tapered valve plug B which has now been lifted from its seat is now rotated to the full open or closed position. The cam operation is indicated in FIG. 8 which is similar to FIG. 6 of my U.S. Pat. No. 2,988,319.

In accordance with my invention, I also provide a spring connection between the cap and the plug, preferably in the form of a steel pin of substantially less resistance to bending than the pin or rod which connects the cap and plug. The spring pin extends transversely through the stem of the plug B as shown in FIG. 7, and its ends are embedded in the lower portion of the wall of the cap as shown in FIGS. 4, 6, 6a, but cutaway positions are provided in both the plug stem and cap which permit bending the ends of the spring as the head and plug are rotated relative to each other (FIG. 6a), thus providing tension in the spring pin which tends to restore the cap and plug to the normal position shown in FIG. 6 when the tapered plug has been lifted from its seat and friction with the wall of the casing is eliminated.

The general operation of the valve assembly has now been described and a specific description of the numbered parts of the device as shown in the drawings follows.

PREFERRED EMBODIMENT

Figure 2:
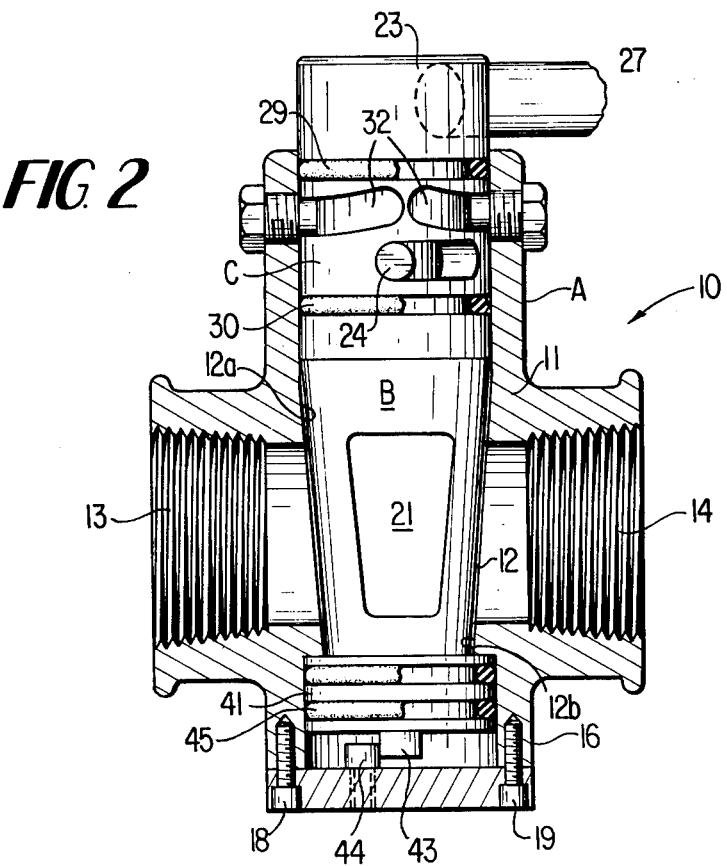
FIG. 2 is a view similar to FIG. 1 but showing the operating member, cap or head of the valve plug actuating unit rotated from the position shown in FIG. 1, partially lifting the valve plug, but with the valve plug itself not yet rotated.
Figure 3:
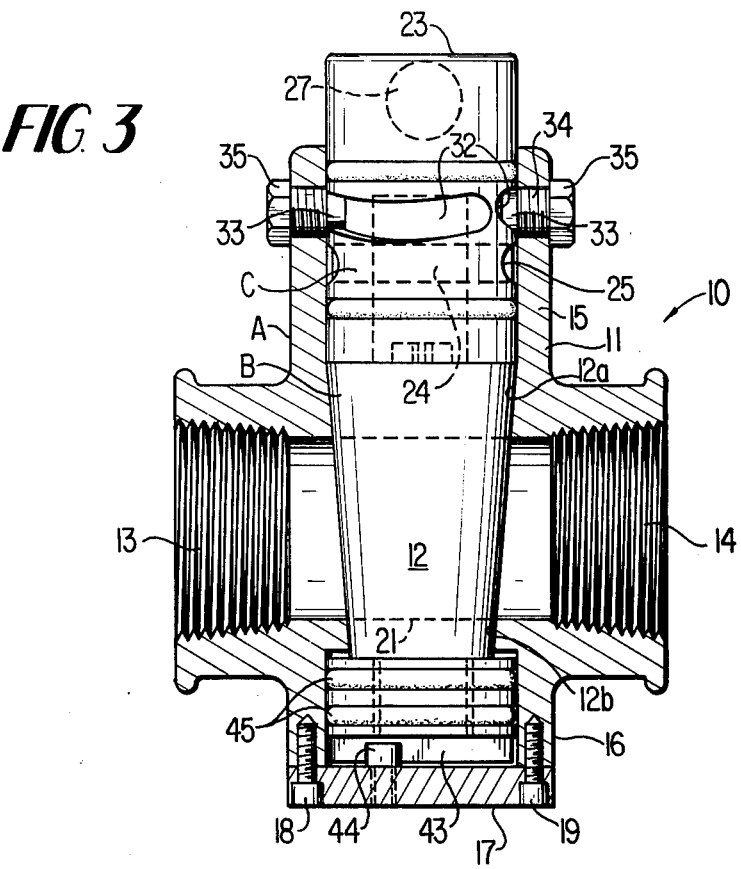
FIG. 3 is a view similar to FIGS. 1 and 2 but with the valve plug rotated to open position.
Figure 4:
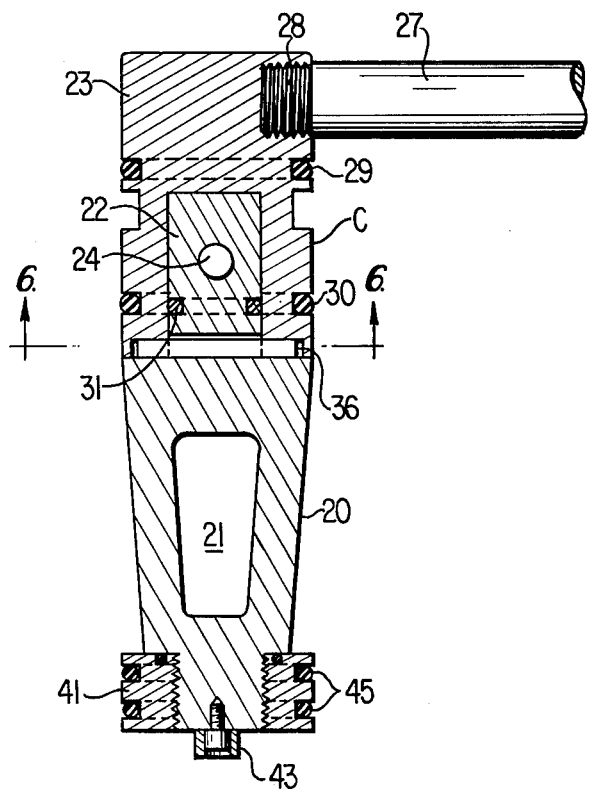
FIG. 4 is a vertical section of the valve plug and operating head shown separate from the valve casing, and with an operating handle shown in elevation.

As shown in FIGS. 1 to 3 inclusive, the rotary valve plug assembly 10 includes a valve casing 11 previously generally referred to as A, comprising a tapered plug valve chamber 12 having an upper or major end portion 12a and a lower or minor end portion 12b. An inlet port or passage 13 leads to the valve chamber 12 and an outlet port or passage 14 leads from the chamber 12. A cylindrical extension 15 of the valve casing is provided at the major end of the valve chamber and a downwardly extending cylindrical portion 16 is provided at the minor end 12b in axial alignment with the upper extension 15. The extension 16 is provided with a readily removable closure plate 17 secured to the extension by means of threaded bolts or screws 18 and 19.

The tapered plug 20 previously referred to as part B fits in the tapered valve chamber 12 and is provided with an opening 21 extending through the valve plug and connecting passages 13 and 14 when the valve is in the open position as shown in FIG. 3. When the plug is in open position, fluid may flow freely from the inlet port 13 through the opening 21 in the valve and out through the outlet port 14.

The above described axial alignment of the cylindrical portions 15 and 16 and the intermediate valve chamber 12 permits ready insertion and removal for assembly and cleaning, and the removable base plate permits access to the lower portion of the valve plug for purposes which will be more apparent hereinafter.

As previously set forth, the tapered valve plug of my U.S. Pat. No. 2,988,319 is in accordance with the present improvement formed of two parts: (1) comprising the plug per se, part 20 previously referred to as part B, and (2) an operating cap or head portion previously referred to as part C.

The tapered valve plug 20 is shown as provided with an upstanding shank, pin or post 22, cylindrical in form and projecting upwardly from the valve plug 20. A cylindrical cap or operating member 23 formerly referred to as part C fits over the shank or post 22 of the plug 20. The cap 23 and the shank 22 are loosely connected through a pin-and-slot connection by means of a strong connecting pin or rod 24 which passes through a slot 25 in the cap 23 and also passes through an opening or passage 26 extending transversely through the post 22 (FIG. 7). A suitable removable operating handle 27 may be provided for the cap 23 or the cap may be flat sided to permit the use of a suitable wrench or other tool as shown in my U.S. Pat. No. 2,988,319. The end of the operating handle is shown as screw threaded at 28 to permit assembly of the handle as indicated in FIG. 4.

In order to insure a fluid tight fit, upper and lower "O" rings 29 and 30 are provided on the exterior of the cap and an "O" ring 31 is provided on the shank or post 22 (FIG. 4). Cam tracks 32, 32 are provided as in my prior U.S. Pat. No. 2,988,319 on the exterior surface of the operating cap 23, these cam tracks coacting with pins 33 extending through the wall of the cylindrical extension 15 and are provided with screw threaded portions 34 and a flat-sided cap or head 35.

As best shown in FIGS. 4, 6, 6a and 7, a transverse spring member or pin 36 extends through the base of the shank 22 and coacts with the head 23 to bias the head and plug back to normal position after partial rotation of the head accompanied by the lifting operation due to the cam tracks 32, 32. As best shown in FIGS. 6 and 6a, the transverse passage 37 extends through the base of the shank member 22 and is flared outwardly at both ends at 38 to permit limited rotary movement of the members 22 and 23 when the ends of the spring 36 are positioned in V-shaped indentations 39—39 in the wall of the outer cap member 23.

When the handle 27 is turned in either direction, rotary movement is first imparted to the operating head or cap member 23 which loosely fits over the post 22 through a pin-and-slot connection which permits limited rotary movement but connects the cap member 23 with the plug member 20 in so far as lifting operation is concerned. The rotary movement of the head or cap member 23 is accompanied by vertical movement of the head due to the inter action of the cam tracks 32, 32 and the cam pins 33. Such vertical movement of the head 23 is imparted to the valve plug 20 by reason of the strong connecting rod or pin 24 and because of the pin-and-slot connection, rotary movement is not immediately transmitted to the valve plug until it has been lifted from its tapered seat thus releasing friction. During the initial rotation of the head 23 relative to the valve plug 20, the spring means or pin 36 is bent and tensioned as indicated at FIG. 6a but as soon as the plug 20 has been lifted from its seat, the tension of the spring 36 is released allowing parts 20 and 23 to return to their normal position shown in FIG. 23. The handle 27 is then moved through the remainder of its course as permitted by the cam tracks to move the valve plug to the full open or closed positions as in U.S. Pat. No. 2,988,319. Positive means other than the cam tracks for stopping rotation of the plug valve in the full open or closed positions will be provided as will be more fully set forth hereinafter.

As best shown in FIGS. 4 and 5, the valve plug 20 is provided with a reduced threaded end portion 40 and a balanced piston member 41 similar to member 26 shown in my U.S. Pat. No. 2,988,319 is provided with internally threaded recessed portion 42 adapted to receive the externally threaded portion 40 at the end of the valve plug. The base 17 of the piston 41 is provided with a transverse stop bar 43 which coacts with the stop members or plugs 44, 44 (FIGS. 1, 2, 3, and 5) for positively limiting the rotation of the valve plug 20. The balancing piston member 41 is shown as provided with "O" rings 45 to prevent leakage of fluid.

The invention has been disclosed in detail for the purpose of illustration but it will be obvious that numerous modifications and variations may be resorted to without departing from the spirit of the invention as set forth in the accompanying claims.

For example while spring means 36 has been described as a pin of spring steel, it may be a bar, plate or leaf of suitable size and strength and may be of any suitable material as will be apparent to those skilled in the art.

What is claimed is:

1. A rotary plug valve comprising a tapered valve plug, valve plug operating means including a rotary and axially movable plug operating head, a valve casing including a tapered valve chamber for receiving said tapered valve plug, said valve chamber having inlet and outlet ports communicating therewith and a first cylindrical extension for receiving said rotary and axially movable plug operating head therein, cam means responsive to rotation of the operating head for imparting axial movement to the head when the head is rotated, said tapered rotary valve plug fitting within said tapered valve chamber and being provided with a transverse for communicating with the inlet and outlet ports when the valve is in open position, first means interconnecting the operating head and valve plug to provide an immediate lifting operation to the plug when the head is rotated to loosen the plug from its seat, said interconnecting means also serving to provide delayed rotation of the plug after initial rotation of the head until the plug has been raised from its seat, and additional interconnecting means comprising a spring pin interposed between the operating head and valve plug for restoring the head and plug to their initial position relative to each other after the plug has been raised from its seat.

2. A rotary plug valve as defined in claim 1 which includes means for positively limiting the rotation of the valve plug in either direction to the fully open or fully closed positions.

3. A rotary plug valve as defined in claim 1 wherein the valve casing includes a second axial cylindrical portion extending from the opposite end of the casing from the operating head receiving casing portion, and a piston rotatably and slidably mounted therein.

4. A rotary valve as defined in claim 3 wherein the piston receiving cylinder is provided with an end plate and coacting stop means are provided on said piston and end plate respectively.

5. A rotary plug valve as defined in claim 1 wherein the cam means comprises a cam track on the exterior of the plug operating head and a pin extending through the casing into said track.

6. A rotary plug valve as set forth in claim 1 wherein the operating head and valve plug are connected by a pin-and-slot connection permitting limited rotary movement between the head and plug.

7. A rotary plug valve as set forth in claim 1 wherein said additional interconnecting means comprises a spring pin carried jointly by said valve plug and said operating head, said spring pin being tensioned by relative rotation of the said operating head and valve plug, and serving to return the head and plug to their original position relative to each other when the valve plug is loosened from its seat.

8. A rotary plug valve as set forth in claim 7 wherein the valve plug is provided with a protruding stem and the operating head comprises a cap portion fitting over said stem, said spring pin extending through said stem and having its ends anchored in the interior of the cap, said stem and cap having cutaway portions to allow bending of the end portions of the spring pin as the cap and valve plug are rotated relative to each other.

9. A rotary plug valve as set forth in claim 1 wherein the valve plug is provided with a stem portion and said operating head comprises a cap fitting over said stem, said first interconnecting means comprising a pin-and-slot connection wherein the cap is provided with slots and a rigid pin projects through said stem with its ends slidable in said slots.

10. A rotary plug valve as set forth in claim 1 wherein the valve casing includes, in addition to the first operating head receiving cylinder, a second cylinder extending axially in the opposite direction from the tapered valve plug receiving chamber, said second cylinder having a readily removable end plate whereby said rotary valve plug may be readily inserted in or removed from the valve casing through the first cylinder and the outer end of the plug when in place is readily accessible by removal of said end plate.

* * * * *

UNITED STATES PATENT OFFICE
CERTIFICATE OF CORRECTION

PATENT NO. : 4,073,468
DATED : Feb. 14, 1978
INVENTOR(S) : Robert L. Erwin

It is certified that error appears in the above-identified patent and that said Letters Patent are hereby corrected as shown below:

In claim 1, col. 6, line 5 of the above identified patent, after "verse" insert --passage--.

Signed and Sealed this

Seventeenth Day of August 1982

[SEAL]

Attest:

Attesting Officer

GERALD J. MOSSINGHOFF
Commissioner of Patents and Trademarks